United States Patent
Iida et al.

[19]

[11] Patent Number: 5,910,091
[45] Date of Patent: Jun. 8, 1999

[54] ELECTRIC LAWN MOWER

[75] Inventors: Tetsuo Iida; Kenzo Shimada; Joji Maeda, all of Wako, Japan

[73] Assignee: Honda Giken Kogyo Kabushiki Kaisha, Tokyo, Japan

[21] Appl. No.: 08/931,412

[22] Filed: Sep. 16, 1997

[30] Foreign Application Priority Data

Sep. 17, 1996 [JP] Japan .................................... 8-244754

[51] Int. Cl.[6] .................................................. A01D 67/00
[52] U.S. Cl. ............................ 56/16.7; 56/17.5; 56/320.1
[58] Field of Search .......................... 56/6, 7, 11.9, 16.7,
56/196, 17.5, 320.1, 320.2, 202, 205, 100.09;
296/100.09

[56] References Cited

U.S. PATENT DOCUMENTS

| | | |
|---|---|---|
| 3,212,244 | 10/1965 | Wilgus . |
| 4,326,370 | 4/1982 | Thorud ...................................... 56/202 |
| 4,711,077 | 12/1987 | Kutsukake et al. ..................... 56/320.2 |
| 4,930,300 | 6/1990 | Benter et al. ............................. 56/16.7 |
| 5,606,851 | 3/1997 | Bruener et al. ........................... 56/11.9 |
| 5,727,372 | 3/1998 | Kanitz et al. ............................. 56/11.9 |

FOREIGN PATENT DOCUMENTS

| | | |
|---|---|---|
| 2 039 175 | 1/1971 | France . |
| 2039175 | 11/1971 | France . |
| 2 742 300 | 6/1997 | France . |
| WO 93/14621 | 8/1993 | WIPO . |

Primary Examiner—Thomas B. Will
Assistant Examiner—Robert Pezzuto
Attorney, Agent, or Firm—Nikaido Marmelstein Murray & Oram, LLP

[57] ABSTRACT

A cutter housing of an electric lawn mower of a walking type is inclined such that the cutter housing rises in a rearward direction. A battery is mounted to the upper face of a rear portion of the cutter housing. A discharge port for discharging cut grass into a grass bag is formed on a lower face of the rear portion of the cutter housing. An opening area of the discharge port is sufficiently maintained by the rearward rising inclination of the cutter housing. The battery is set to take a forward inclining orientation and the height of the mower body can be held to a low height. Since the battery is arranged above a rear wheel, the weight of the battery is supported by the rear wheels and the load on the front wheels is reduced so that the running direction of the electric lawn mower can be easily changed.

4 Claims, 7 Drawing Sheets

ELECTRIC LAWN MOWER

BACKGROUND OF THE INVENTION

1. Field of the Invention

The present invention relates to an electric lawn mower of a walking type in which a lawn is cut by rotating a cutter or blade arranged on the lower face of a cutter housing, by an electric motor.

2. Description of the Related Art

Such an electric lawn mower is well known by specifications of U.S. Pat. No. 3,212,244 and French Patent No. 2,039,175.

In the electric lawn mower described in the above specification of U.S. Pat. No. 3,212,244, the grass cut by the cutter is left on the ground as it is. Therefore, it is necessary to collect the cut grass after the lawn is mowed. The electric lawn mower described in the specification of French Patent No. 2,039,175 has a discharge port for discharging the grass cut by the cutter in a right side portion of the mower body. Therefore, the cut grass can be collected if a grass bag is mounted at this discharge port.

When the grass bag is arranged on a side portion of the mower body, the grass bag tends to come in contact with obstacles during the lawn mowing. Accordingly, it is desirable to arrange the grass bag at a rear portion of the mower body. The running direction of an electric lawn mower of a walking type, is changed in a state in which a handle is pushed down and front wheels are lifted from the ground. Accordingly, it is desirable to set the position of the center of gravity of the mower body to be close to the rear wheels. Therefore, it is necessary to arrange the battery which is a heavy object, near the rear wheels. However, when the battery is mounted on the rear portion of the mower body and the discharge port for the grass is arranged in the rear portion of the mower body, the overall height of the mower body is increased. In contrast to this, when the overall height of the mower body is reduced, no opening area for the discharge port can be sufficiently maintained.

Further, the electric lawn mower has an electric motor for driving the cutter, the battery for supplying power to the electric motor, a controller for controlling an operation of the electric motor, etc. Accordingly, it is necessary to arrange a cover for protecting these devices from rainwater and dust. In the electric lawn mower described in the above specification of U.S. Pat. No. 3,212,244, a clearance is formed between the cover and the electric motor, or is formed at a lower edge of the cover. Therefore, a problem exists in that the rainwater and the dust cannot be completely stopped. In the electric lawn mower described in the above specification of French Patent No. 2,039,175, the electric motor, etc. are completely covered with the cover, but no structure for opening and closing this cover is considered. Therefore, a problem exists in that it is complicated to open and close the cover to maintain the mower.

SUMMARY OF THE INVENTION

In consideration of the above situations, a first object of the present invention is to provide an electric lawn mower in which a battery is mounted to a rear portion of the mower body and a discharge port for grass is arranged in the rear portion of the mower body, wherein the opening area of the discharge port is sufficient in size while the overall height of the mower body is maintained at a low height.

A second object of the present invention is to provide an electric lawn mower in which an electric motor, etc. can be reliably protected from rainwater and dust and can be easily maintained.

To achieve the above first object, an electric lawn mower according to a first feature of the present invention is an electric lawn mower of a walking type, in which front and rear portions of a cutter housing are respectively supported by front and rear wheels, and a cutter arranged within a scroll formed on a lower face of the cutter housing, is rotated by an electric motor connected to a battery. An upper face or surface of the cutter housing is inclined such that this upper face of the cutter housing rises rearwardly, and a discharge port for discharging the cut grass from the scroll is formed at a rear end of the cutter housing. A battery is mounted on the upper face of a rear portion of the cutter housing.

In accordance with the above construction, the entire height of the mower body can be maintained to a low height while the opening area of the discharge port is sufficiently large. Further, the battery as a heavy object, is arranged in the vicinity of the rear wheels so that the running direction of the electric lawn mower can be easily changed.

To achieve the above first object, in addition to the first feature, a second feature of the present invention is an electric motor arranged approximately at the center of the upper face of the cutter housing, and a controller for controlling the operation of the electric motor arranged on a front side of the electric motor. The battery is arranged on a rear side of the electric motor.

In accordance with the above second feature, the upward space of the cutter housing is effectively utilized and the electric lawn mower can be made compact.

To achieve the second object, a third feature of the present invention is an electric lawn mower of a walking type for cutting a lawn using an electric motor for rotating a cutter arranged on the lower face of a cutter housing. The electric motor, a battery for supplying power to the electric motor, and a controller for controlling an operation of the electric motor are attached to an upper face of the cutter housing. A waterproof/dustproof space is formed between the cutter housing and a housing cover pivotally supported and freely opened and closed so as to cover the upper face of the cutter housing. The electric motor, the battery and the controller are located in this waterproof/dustproof space.

In accordance with this construction, the electric motor, the battery and the controller can be protected from water and dust. Further, the battery, etc. can be easily exchanged and maintained by opening the housing cover. Furthermore, the electric motor, the battery and the controller are perfectly covered with the housing cover so that the external appearance of the electric lawn mower is smart.

To achieve the above second object, in addition to the third feature, a fourth feature of the present invention is the cutter housing having a discharge port for discharging the grass cut by the cutter to a grass bag. A discharge port cover covers the discharge port so as to freely open and close the discharge port. The housing cover and the discharge port cover are pivotally supported by a common hinge shaft.

In accordance with this construction, the number of parts is reduced so that cost of the electric lawn mower can be reduced and the mower can be made lightweight and compact.

The other objects, features and advantages of the present invention will become apparent from explanations of the following preferred embodiment described in detail with reference to the accompanying drawings.

DESCRIPTION OF THE PREFERRED EMBODIMENT

Figure 1:
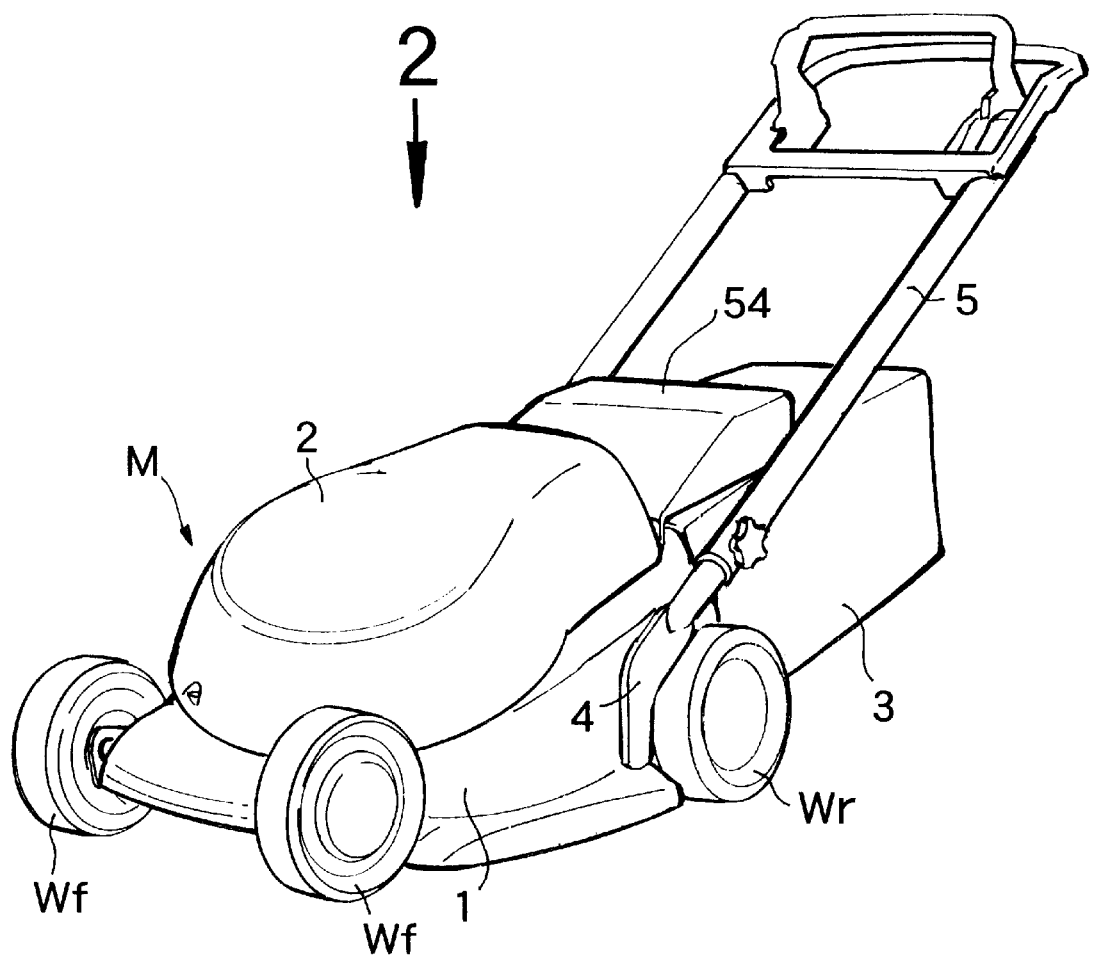
FIG. 1 is a perspective view of an entire electric lawn mower of an embodiment of the present invention.

As shown in FIG. 1, an electric lawn mower M has a cutter housing 1 which is also used as a mower frame. A pair of left and right front wheels Wf, Wf are arranged at a front portion of this cutter housing 1. A pair of left and right rear wheels Wr, Wr are arranged at a rear portion of the cutter housing 1. A bowl-shaped housing cover 2 is arranged on an upper face or surface of the cutter housing 1 such that this housing cover 2 can be freely opened and closed. A grass bag 3 for storing cut grass is detachably arranged at the rear end of the cutter housing 1. A handle 5 for operating the electric lawn mower M, is supported by handle stays 4, 4 fixed to left and right rear ends of the cutter housing 1, such that the length of the handle 5 can be freely adjusted.

Figure 2:
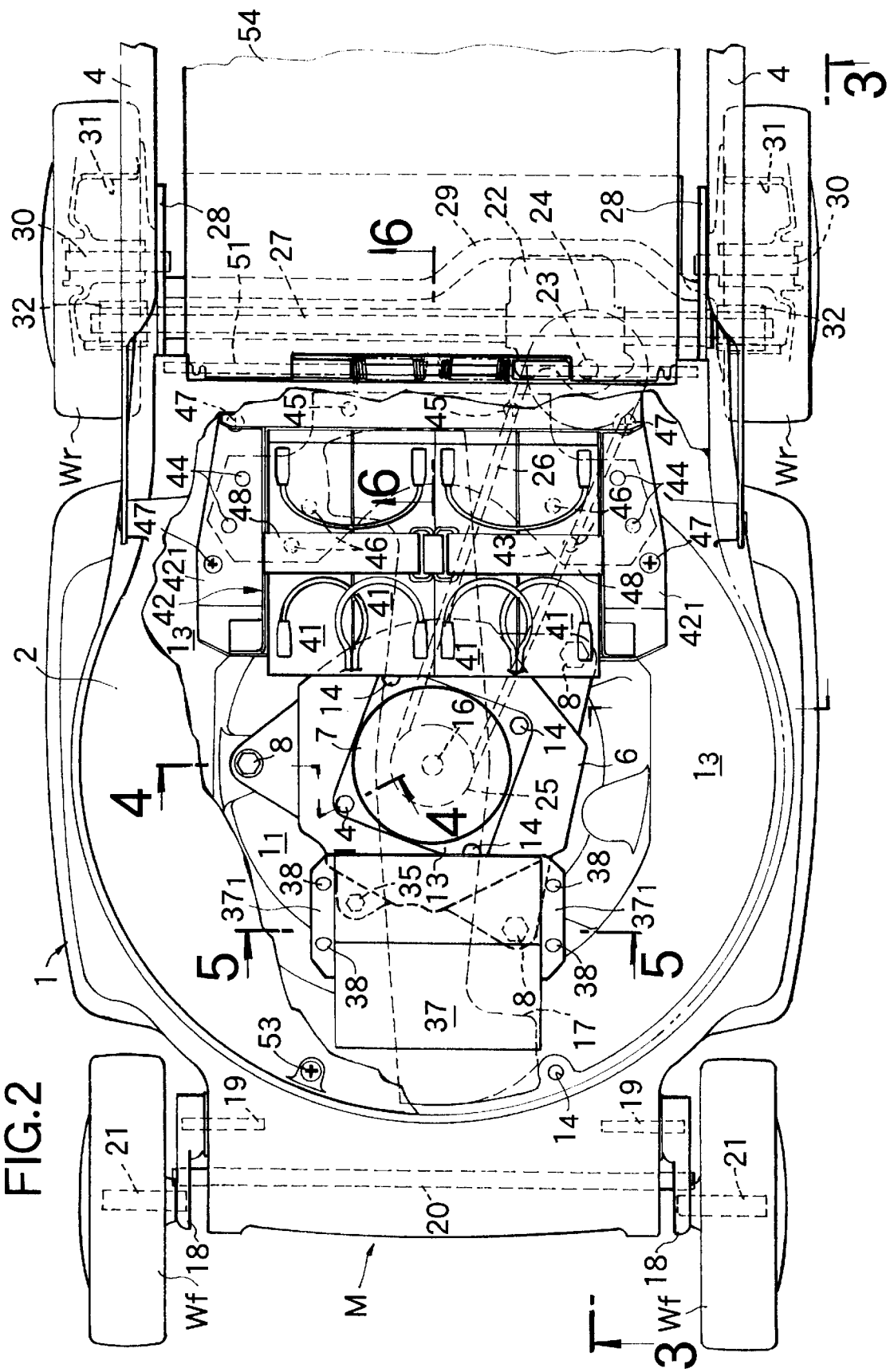
FIG. 2 is a view seen from the direction of arrow 2 in FIG. 1.
Figure 3:
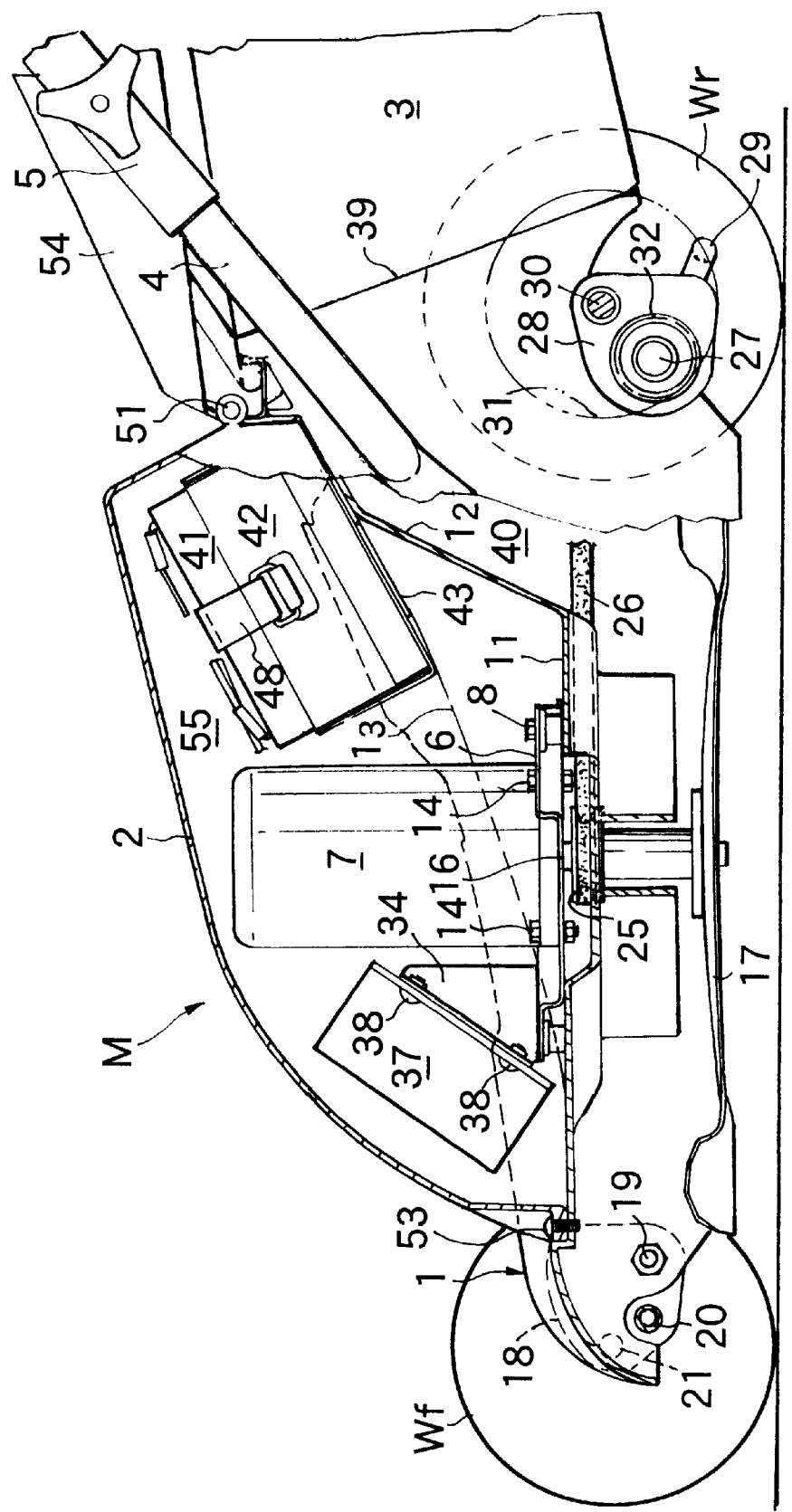
FIG. 3 is a cross-sectional view taken along line 3—3 in FIG. 2.
Figure 4:
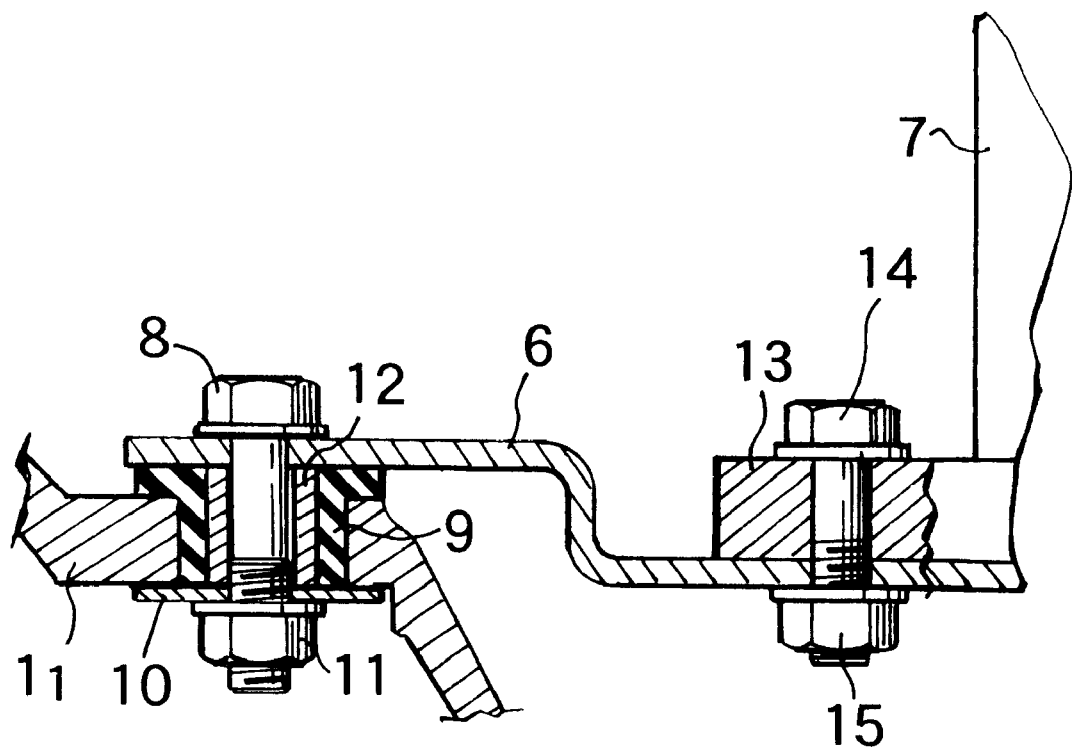
FIG. 4 is an enlarged sectional view taken along line 4—4 in FIG. 2.

As can be clearly seen from FIGS. 2 and 3, a substantially flat motor supporting portion $1_1$ is formed in a central portion of the cutter housing 1. An electric motor 7 is supported by this motor supporting portion $1_1$ through a motor supporting bracket 6. The motor supporting bracket 6 is formed with a plate body of approximately a triangular shape and is attached to the motor supporting portion $1_1$ of the cutter housing 1 at three attaching portions corresponding to three vertexes of the plate body. One of these three attaching portions is shown in detail in FIG. 4. A bolt 8 inserted into the motor supporting bracket 6 extends through a rubber bush 9 formed in the motor supporting portion $1_1$ and is fastened to the motor supporting portion $1_1$ by a nut 11 through a washer 10. A collar 12 having a predetermined length, is arranged between the rubber bush 9 and the bolt 8 to provide a predetermined compressing amount to the rubber bush 9. A flange 13 is on the lower face of a motor 7 and is fixed to a center of the motor supporting bracket 6 by four sets of bolts 14, and nuts 15. As shown in FIG. 3, an output shaft 16 of the motor 7 is arranged in a vertical direction and extends downward through the motor supporting bracket 6 and the motor supporting portion $1_1$ of the cutter housing 1. A cutter 17 having two blades is attached to a lower end of the output shaft 16. The cutter 17 may be replaced with a cutter having two blades in each of the upper and lower portions thereof.

Front wheel supporting members 18, 18 each formed in a plate shape, are pivotally supported on the left and right sides of a front portion of the cutter housing 1 through swinging shafts 19, 19, such that the front wheel supporting members 18, 18 are freely swung. This pair of front wheel supporting members 18,18 are integrally connected to each other by a connecting member 20. The front wheels Wf, Wf are rotatably supported by the front wheel supporting members 18, 18 through axles 21, 21. The pair of front wheel supporting members 18, 18 are respectively swung around the swinging shafts 19, 19 and are locked by a locking means (not shown) so that a mower height of the mower body front portion can be arbitrarily adjusted and the clearance between the cutter 17 and the ground can be changed.

A transmission 22 is mounted on the left side of a rear portion of the cutter housing 1. A transmission input shaft 23 extends upward from the transmission 22. A driven pulley 24 on transmission input shaft 23 is connected to a drive pulley 25 on the output shaft 16 of the motor 7, through an endless belt 26. Rear wheel supporting members 28, 28 each formed in a plate shape, are swingably supported at both ends of transmission output shaft 27, extending from the transmission 22 in left and right directions of the mower body and are integrally connected to each other by a connecting member 29. One portion of the connecting member 29 is curved rearwardly to avoid interference with the transmission 22. The rear wheels Wr, Wr are rotatably supported by the rear wheel supporting members 28, 28 through axles 30, 30. Pinions 32, 32 are fixed to both ends of the transmission output shaft 27 and are respectively engaged with ring gears 31, 31 arranged on inside diameter portions of the rear wheels Wr, Wr.

Accordingly, rotation of the output shaft 16 of the motor 7 is transmitted to the ring gears 31,31 through the drive pulley 25, the endless belt 26, the driven pulley 24, the transmission input shaft 23, the transmission 22, the transmission output shaft 27 and the pinions 32, 32. Thus, the rear wheels Wr, Wr are rotated and the electric lawn mower M runs. The pair of left and right rear wheel supporting members 28, 28 connected to each other by the connecting member 29, are swung around the transmission output shaft 27 and are locked by a locking means (not shown) so that the mower height of the mower body rear portion is arbitrarily adjusted and the clearance between the cutter 17 and the ground can be changed. At this time, no relation in engagement between the pinions 32,32 and the ring gears 31,31 is influenced by this change so that driving force of the motor 7 can be transmitted to the rear wheels Wr, Wr without any problem.

Figure 5:
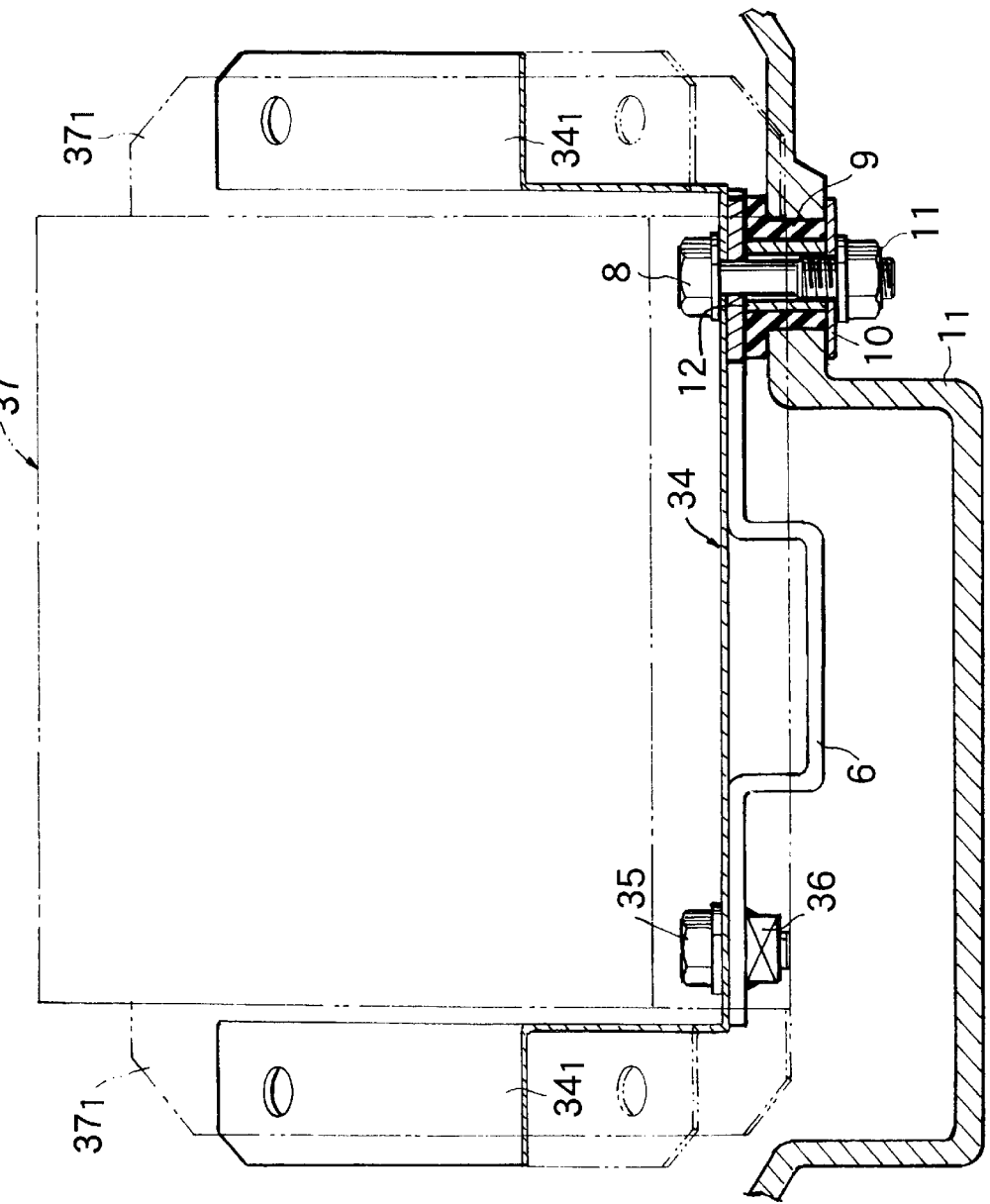
FIG. 5 is an enlarged sectional view taken along line 5—5 in FIG. 2.

As can be clearly seen from FIGS. 2, 3 and 5, a controller 37 for controlling an operation of the motor 7, is attached to a front portion of the motor supporting portion $1_1$ of the cutter housing 1, through a controller supporting bracket 34. The controller supporting bracket 34 is formed by folding one metal plate. The left side of a bottom face of the controller supporting bracket 34 is fastened to the cutter housing 1 by one of the three bolts 8 for fixing the motor supporting bracket 6 to the cutter housing 1. The right side of the bottom face of the controller supporting bracket 34 is fixed to the motor supporting bracket 6 by a bolt 35 and a nut 36.

A pair of flanges $34_1$, $34_1$ are formed on both the left and right sides of the controller supporting bracket 34 and are inclined such that these flanges are lowered on their front sides. A pair of flanges $37_1$, $37_1$ of the controller 37 are overlapped with these flanges $34_1$, $34_1$ and are fixed to these flanges $34_1$, $34_1$ by four bolts 38. Thus, the controller 37 is inclined such that the controller 37 is lower on the front side. The controller 37 is then mounted to the front portion of the cutter housing 1. Accordingly, it is possible to avoid interference between an upper face of the controller 37 and an inner face of the housing cover 2 while the housing cover 2 is maintained in a smooth shape.

As can be clearly seen from FIGS. 2 and 3, a central inclining wall $1_2$ rises rearward and upward from a rear side of the motor supporting portion $1_1$ of the cutter housing 1. A rear edge of the central inclining wall $1_2$ forms the upper edge of a discharge port 39 formed at a rear end of the cutter housing 1. A pair of side portion inclining walls $1_3$, $1_3$ are formed on both the left and right sides of the cutter housing 1 and are inclined such that the side portion inclining walls rise rearward. A scroll 40 for guiding grass cut by the cutter 17, to the discharge port 39 is formed on the lower faces or surfaces of the motor supporting portion $1_1$, the central inclining wall $1_2$ and the pair of side portion inclining walls $1_3$, $1_3$. The height of the upper wall of the scroll 40 from the ground is lowest at a front portion of the mower body and is highest at a rear portion of the mower body near the discharge port 39.

Four batteries 41 for providing power to the motor 7, are arranged in a space to the rear of the motor 7. The batteries 41 are fixed to the cutter housing 1 through a supporting plate 43 for supporting the lower face of a battery box 42 having an open upper face. The batteries 41 are stored in the battery box 42. The battery box 42 has a pair of side portion flanges $42_1$, $42_1$ projecting from the left and right sides. These side portion flanges $42_1$, $42_1$ and the supporting plate 43 are fastened together to the side portion inclining walls $1_3$, $1_3$ through two rivets 44 on each of the left and right sides. A rear portion of the supporting plate 43 and the rear portion inclining wall $1_2$ are fixed to each other by two rivets 45, 45. Further, a bottom wall of the battery box 42 and the supporting plate 43 are fixed to each other by two rivets 46, 46 on each of the left and right sides. Furthermore, one pair of side portion flanges $42_1$, $42_1$ of the battery box 42 are fixed to the side portion inclining walls $1_3$, $1_3$ by two bolts 47, 47, respectively. The four batteries 41, stored into the battery box 42, are fixed by a pair of belts 48, 48 on the left and right sides.

The battery box 42 is supported such that a front portion of a bottom face of the battery box 42 is projected in an upward space of the motor supporting portion $1_1$ of the cutter housing 1 (see FIG. 3). Further, the batteries 41 are mounted to the battery box such that the batteries are lowered forward along the central inclining wall $1_2$ and the side portion inclining walls $1_3$, $1_3$ slantingly lowered forward. Accordingly, while an open area of the discharge port 39 at a terminal end of the scroll 40 is sufficiently large, interference between the batteries 41 and the housing cover 2 is avoided and a front height of the mower body can be held to a low height.

The batteries 41, the motor 7 and the controller 37 are arranged forward and rearward along a central line of the mower body. Accordingly, it is possible to uniformly load the left side front wheel Wf and rear wheel Wr, and the right side front wheel Wf and rear wheel Wr. When running directions of the electric lawn mower M are changed, an operator pushes the handle 5 down and raises the front wheels Wf, Wf from the ground. However, since the batteries 41, which are heavy objects, are arranged in the vicinity of the rear wheels Wr, Wr, the required pushing-down load on the handle 5 is reduced so that the running directions of the electric lawn mower are easily changed. Further, the controller 37 is arranged on the front side with respect to the motor 7 and the batteries 41 are arranged on the rear side. Accordingly, the upward space of the cutter housing 1 is effectively utilized and the mower body can be made compact.

Figure 6:
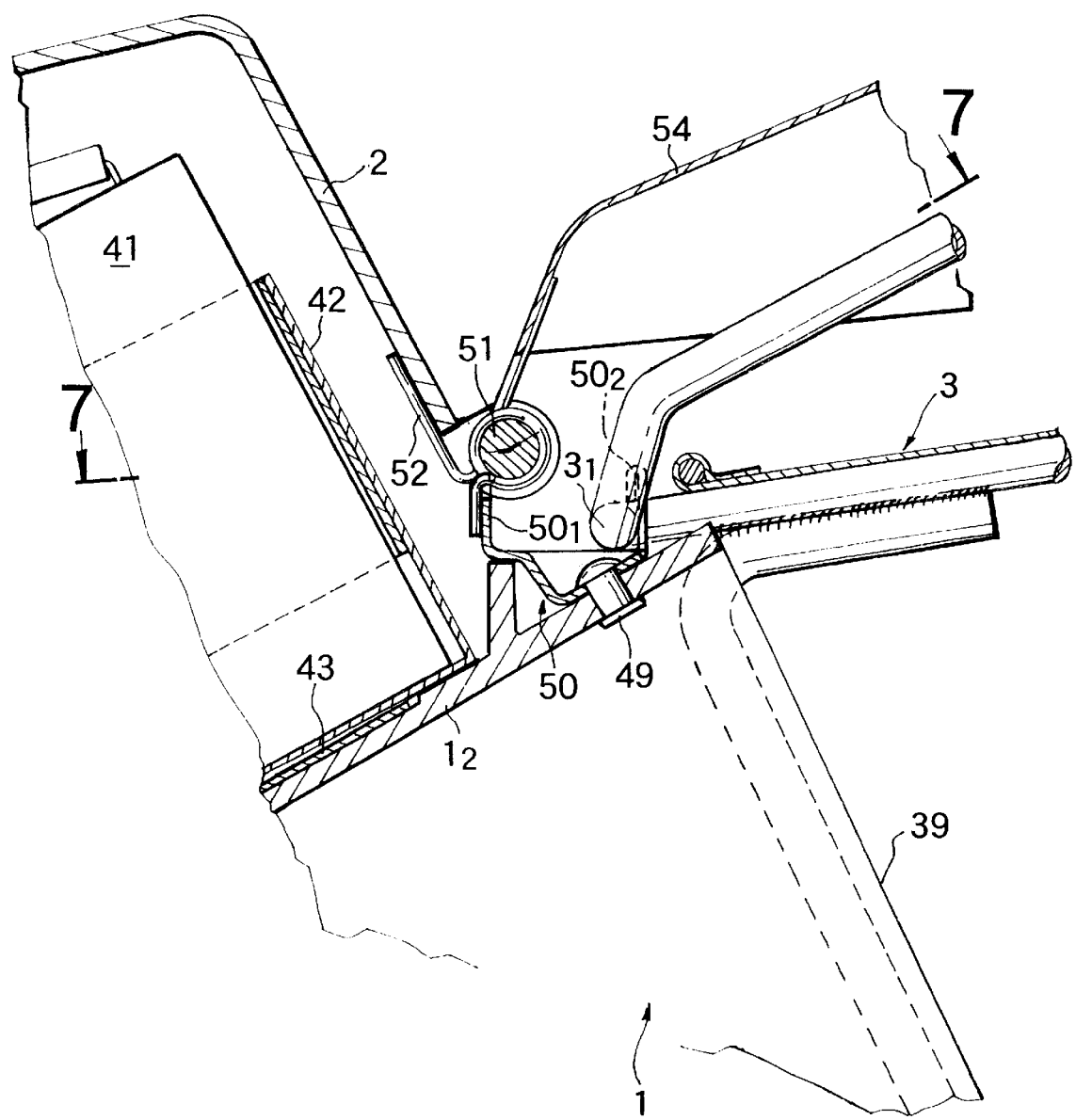
FIG. 6 is an enlarged sectional view taken along line 6—6 in FIG. 2.
Figure 7:
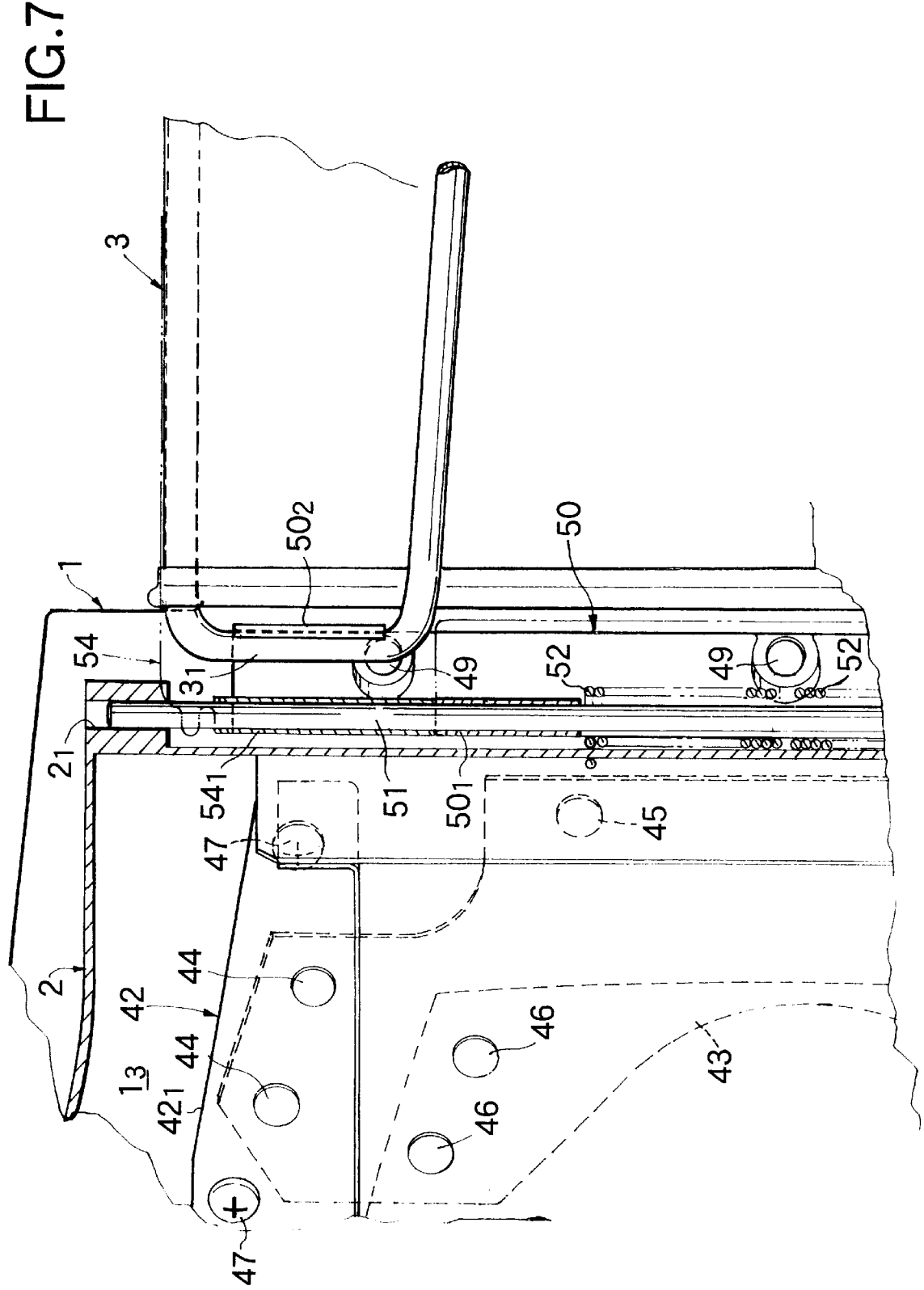
FIG. 7 is a cross-sectional view taken along line 7—7 in FIG. 6.

As can be clearly seen from FIGS. 6 and 7, a hinge bracket 50 is fixed to a rear end of the central inclining wall $1_2$ of the cutter housing 1 by rivets 49. A hinge shaft 51 extending in left and right directions of the mower body, is supported by arm portions $50_1$, $50_1$ extending to an upper portion of the hinge bracket 50. Both left and right ends of the hinge shaft 51 are respectively fitted to shaft holes $2_1$, $2_1$ of the rear portion of the housing cover 2 at both left and right ends thereof, so that the housing cover 2 can be freely opened and closed around the hinge shaft 51. A pair of springs 52, 52 are wound around the outer circumference of the hinge shaft 51 and biases the housing cover 2 in its opening direction. Accordingly, when the housing cover 2 is manually raised and opened, the applied load is reduced. Two bolts 53, 53 extending downward through a front end of the housing cover 2 are respectively screwed into bolt holes $1_4$, $1_4$ of the cutter housing 1 so that the housing cover 2 is fixed in a closed position (see FIGS. 2 and 3).

A lower edge of the housing cover 2 fixed in the closed position, is closely attached and sealed to an upper face of the cutter housing 1. Therefore, a substantially sealed waterproof/dustproof space 55 is formed between the housing cover 2 and the cutter housing 1. Devices such as the motor 7, the batteries 41, the controller 37, etc., and the harness for connecting these devices, are positioned in the waterproof/dustproof space 55 so that these devices can be reliably protected from rainwater and dust. Further, maintenance work, such as exchange of the batteries 41, can be easily made by only detaching the two bolts 53, 53 and rotating the housing cover 2 around the hinge shaft 51 to open this housing cover 2. Furthermore, the motor 7, the batteries 41, the controller 37, etc. are perfectly covered with the housing cover 2 so that the external appearance of the electric lawn mower becomes smart and is improved in beauty.

Two engaging portions $50_2$, $50_2$ are integrally formed in the above hinge bracket 50. These engaging portions $50_2$, $50_2$ are respectively engaged with hook portions $3_1$, $3_1$ formed in the grass bag 3 so that the grass bag 3 is mounted on the discharge port 39 of the cutter housing 1. A pair of left and right sleeve-shaped portions $54_1$, $54_1$ integrally formed at a front end of a discharge port cover 54, are fitted to an outer circumference of the hinge shaft 51. The discharge port cover 54 can be vertically swung between an opening position (see FIG. 1) and a closing position. In the opening position, the discharge port cover 54 is swung upward around the hinge shaft 51 and is held above the grass bag 2. In the closing position, when the grass bag 3 is detached, the discharge port 39 is covered with the discharge port cover 54 and a lower end of the discharge port cover 54 is set to a discharge hole.

Thus, the discharge port cover 54 is pivotally supported by utilizing the hinge shaft 51 of the housing cover 2. Accordingly, both the housing cover 2 and the discharge port cover 54 can be pivotally supported by one hinge shaft 51. Therefore, the electric lawn mower M can be made compact and light in weight, and the cost of the electric lawn mower can be reduced, by reducing the number of parts thereof.

The motor 7 is commonly used to run the electric lawn mower and operate the cutter 17 in the above embodiment. However, separate motors may be respectively arranged to run the electric lawn motor and operate the cutter 17.

The embodiment of the present invention has been described in detail as mentioned above, but the present invention can be modified in various kinds of designs within a range not departing from features of the present invention.

What is claimed is:

1. A walking-type electric lawn mower comprising:
   (a) a cutter housing;
   (b) a rotating grass cutter positioned on a lower face of said housing;
   (c) an electric motor mounted on an upper face of said housing for rotating said cutter;

(d) a battery for supplying power to said electric motor, mounted on the upper face of said housing;

(e) a controller for controlling the operation of said electric motor, mounted on the upper face of said housing; and (f) a housing cover pivotally mounted on and in contact with said housing for covering the upper face of said housing wherein a waterproof/dustproof space is formed between said housing and said housing cover, and wherein said electric motor, said battery, and said controller are positioned in said waterproof/dustproof space.

2. An electric lawn mower as claimed in claim 1, wherein said cuter housing includes a discharge port for discharging the grass cut by said cutter into a grass bag, a discharge port cover for covering said discharge port, and a pivot shaft for pivotally mounting said housing cover and said discharge port cover, such that said housing and said discharge port are uncovered and covered by the respective rotation of said housing cover and said discharge port cover around said pivot shaft.

3. A walking-type electric lawn mower comprising:

(a) a cutter housing, inclined such that an upper face thereof rises in a rearward direction to have a rearwardly raised wall portion;

(b) front wheels and rear wheels, mounted on said housing;

(c) a grass cutter positioned in said housing;

(d) an electric motor mounted on said housing for rotating said cutter wherein said electric motor is positioned at an approximate center of the upper face of said cutter housing;

(e) a battery mounted on said housing for providing power to said electric motor wherein said battery is mounted on said rearwardly raised wall portion of said upper face of said cutter housing and positioned on a rear side of said electric motor;

(f) a discharge port for discharging cut grass from said cutter housing into a grass bag, said discharge port being formed at said rearwardly raised wall portion of said cutter housing;

(g) a controller for controlling the operation of said electric motor, said controller being positioned on a front side of said electric motor; and (h) a housing cover pivotally mounted on and placed in contact with said housing for covering the upper face of said housing wherein a waterproof/dustproof space is formed between said housing and said housing cover, and wherein said electric motor, said battery, and said controller are positioned in said waterproof/dustproof space.

4. An electric lawn mower as claimed in claim 3, wherein said housing includes a scroll formed on a lower face thereof, and wherein said cutter is positioned in said scroll.

* * * * *